J. H. CRUSE, Jr. & R. COLEMAN.
WAGON GEAR.
APPLICATION FILED JUNE 1, 1912.

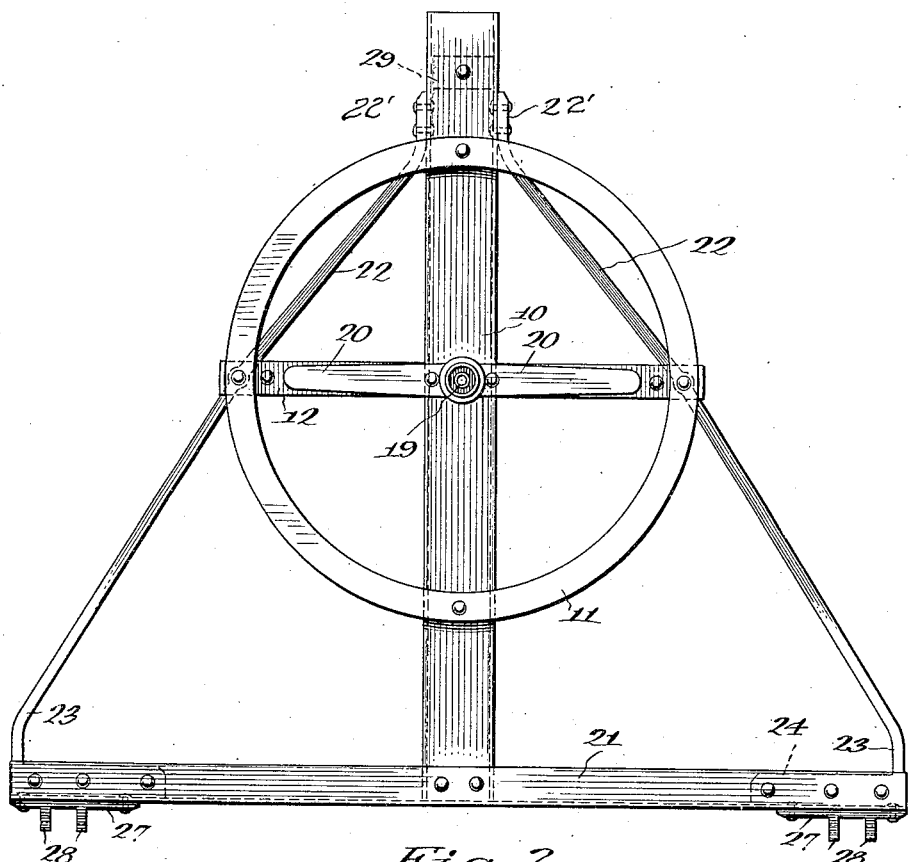

1,065,431.

Patented June 24, 1913.

2 SHEETS—SHEET 2.

WITNESSES

Robert Coleman
J. H. Cruse, Jr.
INVENTORS their Attorney

UNITED STATES PATENT OFFICE.

JOHN H. CRUSE, JR., AND ROBERT COLEMAN, OF BIRMINGHAM, ALABAMA.

WAGON-GEAR.

1,065,431.

Specification of Letters Patent.

Patented June 24, 1913.

Application filed June 1, 1912. Serial No. 701,012.

*To all whom it may concern:*

Be it known that we, JOHN H. CRUSE, Jr., and ROBERT COLEMAN, citizens of the United States, residing at Birmingham, in the county of Jefferson and State of Alabama, have invented certain new and useful Improvements in Wagon-Gears, of which the following is a specification, reference being had therein to the accompanying drawing.

This invention relates to wagon gears and has special reference to improved wagon gears constructed entirely from metallic members fixedly secured together.

The principal object of the invention is to improve and simplify the general construction of devices of this character and to provide a strong and rigid structure while at the same time eliminating weight to the greatest possible extent.

With the above and other objects in view, this invention consists in general of certain novel constructions, combinations and arrangements of parts, as will be hereinafter fully described, illustrated in the accompanying drawings and specifically claimed.

Figure 5:
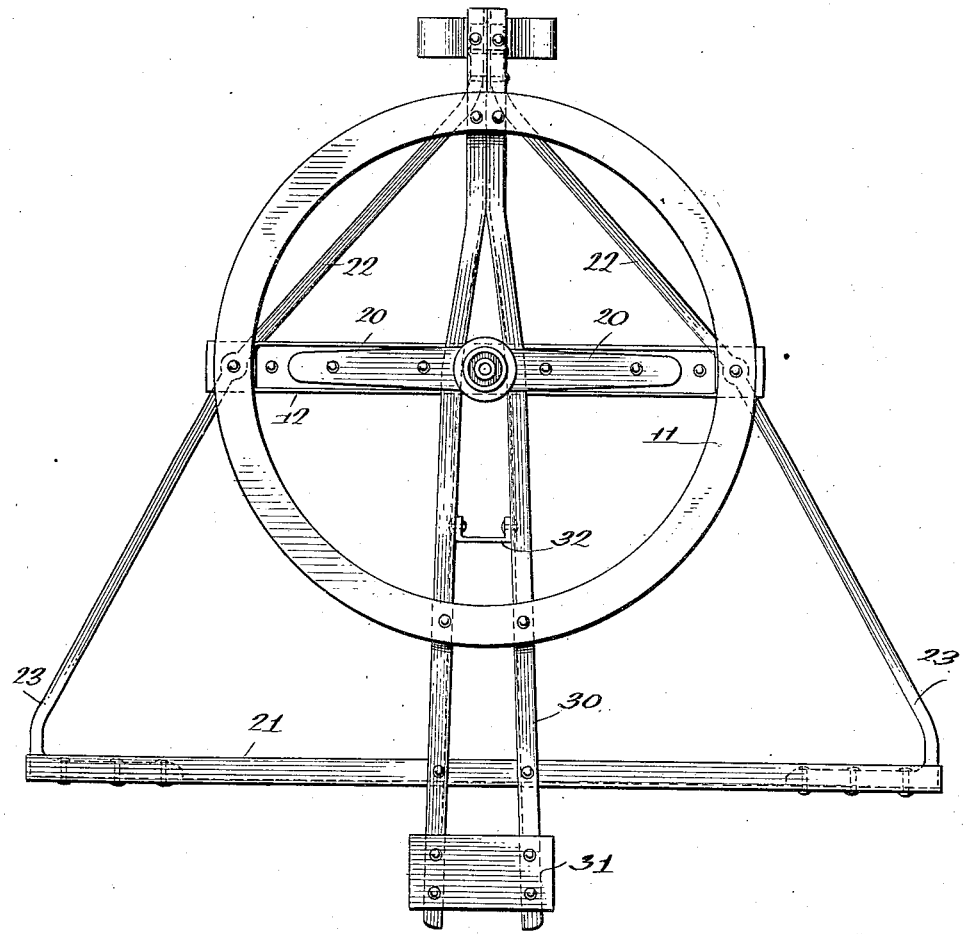
Figure 6:
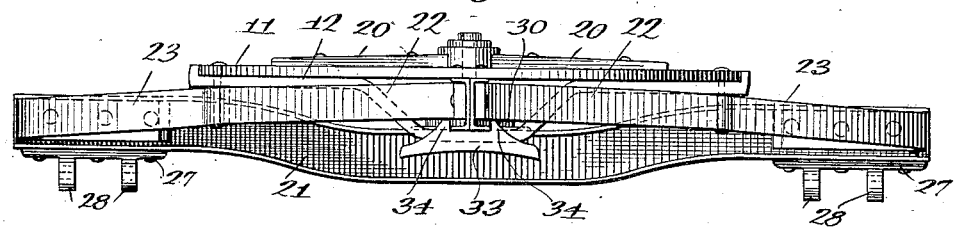

In the accompanying drawings, like characters of reference indicate like parts in the several views, and Figure 1 is a plan view of a wagon gear constructed in accordance with this invention. Fig. 2 is a rear elevation thereof. Fig. 3 is a detail bottom plan view. Fig. 4 is a detail section through a certain transom plate used herewith. Fig. 5 is a plan view of a modified form of the device. Fig. 6 is a rear elevation of such modification.

The invention comprises a center bar 10 which consists of a steel channel so arranged that the flanges extend downward. On top of this center bar 10 is positioned a fifth wheel circle 11 preferably of forged steel and this circle is braced to the center bar 10 by means of the bottom brace 12 which consists of a straight central portion lying horizontally beneath the center bar 10 and at right angles thereto, upwardly inclined portions 13 from the upper ends of which extend horizontal portions 14 each of which is provided at its outer end with an upturned lip 15 which engages the outer periphery of the circle 11. On top of this center bar 10 is also positioned a transom plate consisting of a circular central portion 16 having a reduced upwardly extending portion 17 being provided with an annular flange 18 between the periphery of the portion 16 and the reduced portion 17. Extending through this central portion is an opening 19 for the reception of the king bolt of the wagon. Furthermore, this transom plate has laterally extending arms 20. It is preferred that this plate be made of malleable iron.

Secured to the front end of the center bar 10 is a splinter bar 21 formed of angle iron. This splinter bar is braced to the center bar and fifth wheel circle by means of certain braces 22, each of which has one end portion 22' securely riveted to the center bar adjacent the rear end thereof, and is riveted intermediate its length to the bottom brace and fifth wheel circuit. The remaining end portion 23 extends parallel to the center bar, and has an inwardly extending portion 24 securely riveted to the splinter bar 21 at its end. The rivets which secure this portion 24 to the splinter bar also serve to secure the spring hangers each of which consists of a base plate 25 from which extends a pair of ears 26 through which the ends of the spring are passed. At each end of the splinter bar 21 there is also provided a shaft coupling consisting of a base plate 27 whereon is a pair of spaced ears 28 to receive the shaft coupling bolt. These last two parts are preferably of malleable iron.

Between the flanges of the member 10 adjacent the rear end thereof there is secured a spring seat 29.

In the modification shown in Figs. 5 and 6 the center bar 10 is replaced by a pair of hounds, each of which consists of a channel 30 with the flanges facing outwardly. These hounds are held apart at the front end by a brace plate 31 and intermediate their ends they are braced apart by a brace 32. At the rear ends the hounds are secured together with the backs of the webs resting against each other, as can be seen by reference to Fig. 5. The structure thus becomes analogous to an I beam and the spring seat is modified to provide a form such as is shown in Fig. 6 at 33 having ears 34 which engage on the sides of the channel webs.

There has thus been provided a simple and efficient device of the kind described, and for the purpose specified.

It is obvious that many minor changes may be made in the form and construction of this invention without departing from the material principles thereof and it is therefore not wished to confine the invention to the exact form herein shown and described, but it is wished to include all such as properly come within the scope of the appended claims.

Having thus described the invention, what is claimed as new, is:—

1. In a wagon gear of the character described, a longitudinally extending beam, a transverse beam carried by said longitudinally extending beam, diagonal braces secured at one end of said longitudinal beam and having their remaining ends bent inwardly and secured to the end portions of said transversely extending beam, and depending lugs carried by the inturned end portions of said braces.

2. In a wagon gear of the character described, a longitudinally extending beam formed from a pair of channel bars having one end portion secured together and the remaining portion held in spaced relation, a spring seat at the connected ends of said channel bars and provided with lugs extending over the edges of said channel bars to hold said seat in engagement with the channel bars, a transversely extending bar secured to said longitudinally extending beam, and braces secured at one end of said longitudinally extending beam and having their remaining ends secured to the end portions of said transversely extending bar.

In testimony whereof we hereunto affix our signatures in presence of two witnesses.

JOHN H. CRUSE, Jr.
ROBT. COLEMAN.

Witnesses:
J. F. CRUSE,
C. R. CHRISTOPHER.

---

Copies of this patent may be obtained for five cents each, by addressing the "Commissioner of Patents, Washington, D. C."